US011453493B2

(12) United States Patent
Tumuluru

(10) Patent No.: US 11,453,493 B2
(45) Date of Patent: *Sep. 27, 2022

(54) SUBMERGIBLE AERIAL VEHICLE

(71) Applicant: Aurora Flight Sciences Corporation, Manassas, VA (US)

(72) Inventor: Samvruta Tumuluru, San Francisco, CA (US)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 347 days.

This patent is subject to a terminal disclaimer.

(21) Appl. No.: 16/848,095

(22) Filed: Apr. 14, 2020

(65) Prior Publication Data
US 2021/0316854 A1  Oct. 14, 2021

(51) Int. Cl.
| B64C 35/00 | (2006.01) |
| B63G 8/22 | (2006.01) |
| B60F 5/02 | (2006.01) |
| B64C 37/00 | (2006.01) |
| B63G 8/00 | (2006.01) |

(52) U.S. Cl.
CPC .............. *B64C 35/008* (2013.01); *B60F 5/02* (2013.01); *B63G 8/22* (2013.01); *B64C 37/00* (2013.01); *B63G 8/001* (2013.01); *B63G 2008/005* (2013.01); *B64C 2201/108* (2013.01); *B64C 2201/12* (2013.01); *B64C 2201/126* (2013.01)

(58) Field of Classification Search
CPC . B60F 5/02; B64C 37/00; B64C 37/02; B64C 2201/12; B63G 8/001; B63G 8/22; B63G 2008/002; B63G 2008/004; B63G 2008/005
See application file for complete search history.

(56) References Cited

U.S. PATENT DOCUMENTS

| 2012/0158215 A1* | 6/2012 | Sun | B64C 27/20 701/1 |
| 2016/0376000 A1* | 12/2016 | Kohstall | B64C 39/024 114/313 |
| 2017/0197714 A1* | 7/2017 | Golden | B60F 5/02 |

(Continued)

OTHER PUBLICATIONS

Alzu'bi, H. M. A. Q., 2018, "Loon Copter: Modeling, Implementation, and Stability Control of a Fully-Featured Aquatic-Aerial Quadcopter" (2018). https://www.proquest.com/docview/2078904684?accountid=14753&pq-origsite=primo&parentSessionId=Mjrvoqmd1ok2l9%2FlgkLWpkRvEp3lSzMmYbkTA25ztPE%3D (Year: 2018).*

(Continued)

*Primary Examiner* — Richard R. Green
*Assistant Examiner* — Arfan Y. Sinaki
(74) *Attorney, Agent, or Firm* — Coats & Bennett, PLLC

(57) ABSTRACT

A submergible aerial vehicle with one or more rotors, a body operatively connected to the one or more rotors, and a platform operatively connected to the body. The vehicle is configured to operate with one or more additional vehicles such that the platform of each vehicle connects together and forms a segment of an enlarged floating platform. The enlarged platform is configured to support an object above the water. The body includes a cavity that is able to be at least partially filled with fluid. The cavity causes the submergible aerial vehicle to be at least partially submerged in a body of water.

20 Claims, 14 Drawing Sheets

(56) References Cited

U.S. PATENT DOCUMENTS

2021/0261248 A1* 8/2021 Clark .................. B64C 39/024

OTHER PUBLICATIONS

Youtube, "New Underwater Drone Flies and Swims", Rutgers Today, Retrieved from the internet: URL: https://www.youtube.com/watch?v=FC9EJhs0pc0 [retrieved on Nov. 13, 2020], pp. 1-98.
Youtube, "Check Out The Loon Copter: A Flying Drone That Swims Underwater!", Science Channel, Retrieved from the internet: URL: https://www.youtube.com/watch?v=rG4lfgXJgHl [retrieved on Nov. 13, 2020], pp. 1-121.

* cited by examiner

SUBMERGIBLE AERIAL VEHICLE

TECHNOLOGICAL FIELD

The present disclosure relates generally to the field of aerial vehicles and, more specifically, to aerial vehicles that can operate both in the air and in the water.

BACKGROUND

A variety of different marine activities such as rescue operations and marine research use vehicles. The vehicles can include aerial vehicles that can fly above the water. These aerial vehicles are productive to perform a variety of aerial tasks such as searching for persons in the water, monitoring the activity of sea life, and transporting materials. Water vehicles that operate in the water are also needed for these activities. These vehicles can remain on the surface of the water and/or can submerge below the surface and operate underwater.

Current vehicles have limited ability as they are able to effectively function either in the air or in the water. A vehicle capable of effectively operating in both air and water is not currently available.

SUMMARY

One aspect is directed to a submergible aerial vehicle comprising one or more rotors, a body operatively connected to the one or more rotors, and a platform operatively connected to the body. The platform is configured to form a segment of a floating platform. The floating platform is configured to support an object. A cavity is in the body and, when at least partially filled with fluid, the cavity causes the submergible aerial vehicle to be at least partially submerged in a body of water.

In another aspect, the cavity comprises a ballast.

In another aspect, the ballast comprises supplies.

In another aspect, the ballast comprises at least a portion of the platform.

In another aspect, at least a portion of the ballast is collapsible.

In another aspect, the vehicle comprises a pump for pumping the fluid in the cavity wherein the pump is operatively connected to the cavity.

In another aspect, the vehicle comprises a pump for pumping the fluid out of the cavity wherein the pump is operatively connected to the cavity.

In another aspect, the submergible aerial vehicle is operable to expel at least some fluid out of the cavity to maintain a level of buoyancy when weight is added to the platform.

In another aspect, a power source is operatively connected to the body.

In another aspect, a solar panel is operatively connected to the platform to recharge the power source.

In another aspect, the submergible aerial vehicle is connectable to a second submergible aerial vehicle.

In another aspect, the submergible aerial vehicle is operable to maneuver in the water, at least partially submerged, via controlling the one or more rotors.

In another aspect, the submergible aerial vehicle is operable to rotate when at least partially submerged, via controlling the one or more rotors.

One aspect is directed to a system of connectable submergible aerial vehicles. The system comprises a plurality of submergible aerial vehicles that each comprise one or more rotors, a body operatively connected to the one or more rotors, and a platform operatively connected to the body. The platform is configured to form a segment of an enlarged platform and the enlarged platform is configured to support an object. The vehicle further comprises a cavity that is in the body and when at least partially filled with fluid, the cavity causes the submergible aerial vehicle to be at least partially submerged in a body of water.

In another aspect, each of the cavities comprises a ballast.

In another aspect, each of the ballasts comprises at least a portion of the platform.

In another aspect, each of the vehicles comprises a pump for pumping the fluid out of the cavity, wherein the pump is operatively connected to the cavity.

In another aspect, the submergible aerial vehicle is operable to expel at least some fluid in order to fly above the body of water.

In another aspect, at least one of the submergible aerial vehicles comprises an inertial navigational system.

One aspect is directed to a method of submerging a submergible aerial vehicle. The method comprises operating a submergible aerial vehicle over a body of water and maneuvering a cavity of the submergible aerial vehicle to contact the body of water. The cavity is below a surface of a platform of the submergible aerial vehicle and the platform is a segment of an enlarged platform. The method also comprises taking fluid into the cavity, wherein the floating platform is configured to support an object.

The features, functions and advantages that have been discussed can be achieved independently in various aspects or may be combined in yet other aspects, further details of which can be seen with reference to the following description and the drawings.

DETAILED DESCRIPTION

Figure 1:
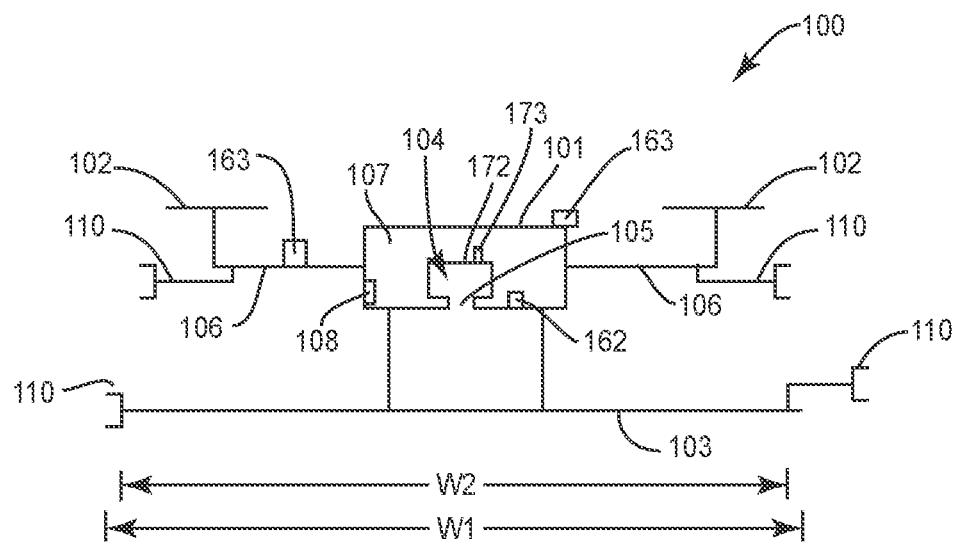
FIG. 1 is a schematic diagram of a vehicle during flight in the air.
Figure 2:
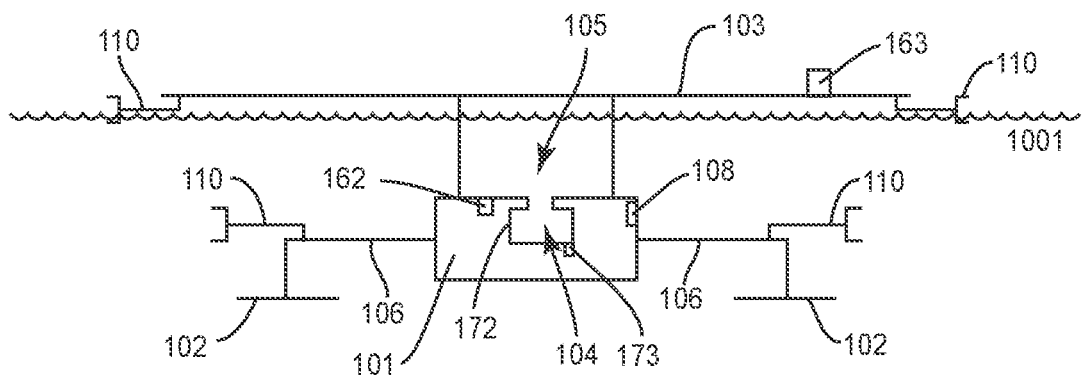
FIG. 2 is a schematic diagram of a vehicle in water.

FIGS. 1 and 2 schematically illustrate a submergible aerial vehicle 100 (hereinafter vehicle 100) that includes one or more rotors 102. As illustrated in FIG. 1, the vehicle 100 is configured to fly due to rotation of the one or more rotors 102. As illustrated in FIG. 2, the vehicle 100 is further configured to submerge and operate within water 1001 and is propelled by the rotors 102.

The vehicle 100 includes a body 101. In one example, the body 101 is solid. In another example, the body 101 is hollow. In one example, the body 101 extends around and forms an interior space 107. The interior space 107 houses electrical components, such as electrical wires, motors, avionics, flight controller, processors, and the like, for the operation of the vehicle 100. The interior space 107 can also be configured to hold payload, such as, cargo, ballast 109, and/or persons that are being transported by the vehicle 100. A door 108 can extend through the body 101 and lead into the interior space 107. The door 108 provides for accessing the interior space 107.

The rotors 102 provide for propelling the vehicle 100 in both the air and water. The number of rotors 102 can vary depending upon the vehicle. In one example, the vehicle 100 includes a single rotor 102. In another example as illustrated in FIGS. 1 and 2, the vehicle 100 includes a pair of rotors 102. Other examples include three or more rotors 102. In one example as illustrated in FIGS. 1 and 2, one or more arms 106 extend outward from the body 101 to support the rotors 102. In another example, the rotors 102 are connected directly to the body 101.

The vehicle 100 includes one or more direction control members 163 to control the direction of movement of the vehicle 100 in both the air and the water. The one or more direction control members 163 are positioned on the exterior of the vehicle 100 and are movable relative to the body 101 or platform 103 to control the motion of the vehicle 100. The control members 163 can be positioned on one or more of the body 101, platform 103, and arms 106.

In another example, the direction of movement of the vehicle 100 is controlled by the rotors 102. The rotors 102 can be tilted and/or the blade pitch can be controlled to control the movement.

In another example, the direction of movement of the vehicle 100 is controlled by adjusting the rotational of the different rotors 102. Differentiating the rotational speed of the rotors 102 causes changes in the total angular momentum by the rotors 102.

A platform 103 is positioned outward from the body 101 and forms a support surface to contact and support an object above the water 1001. In one example, the platform 103 is substantially flat with a length and width (W1 as illustrated in FIG. 1). In one example, the width W1 is greater than a width W2 measured between opposing rotors 102. This larger width provides for the platform 103 to abut against an adjacent platform 103 as will be explained below. In another example, the width W1 is smaller than or equal to the width W2.

In one example, the platform 103 has a fixed shape and size. The platform 103 remains attached to the body 101 during flight in the air and during movement through the water 1001. In another example, the platform 103 is retractable and changeable between a stowed configuration and a deployed configuration. In the stowed configuration, the platform 103 has a smaller size to prevent or reduce drag during movement of the vehicle 100 through the air and water. The stowed platform 103 can be housed within the interior space 107 or against the body 101. In the deployed configuration, the platform 103 is expanded to a larger size.

Figure 16A:
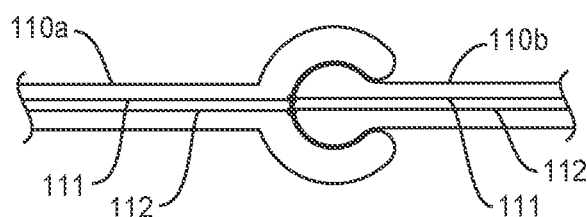
FIG. 16A is a side schematic view of a pair of connectors.
Figure 16B:
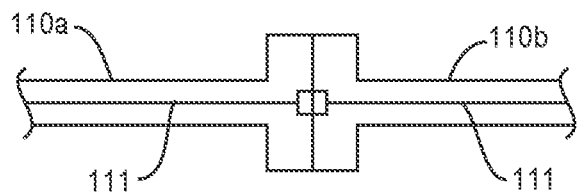
FIG. 16B is a side schematic view of a pair of connectors.

In one example, the platform 103 is deflated in the stowed configuration and inflated in the deployed configuration. In this example, the platform 103 is equipped with a fluid canister that is activated to release fluid into the interior of the platform 103 during deployment. In another example as illustrated in FIGS. 16A and 16B, the platform 103 is constructed from multiple sections 170 that are connected at movable joints 171. In the stowed configuration as illustrated in FIG. 16A, the sections 170 are folded onto each other to provide for a reduced size that is positioned at the body 101. In the deployed configuration as illustrated in FIG. 16B, the sections 170 are unfolded to the deployed configuration and are positioned outward from the body 101.

In one example, the platform 103 is formed by a surface of the body 101. The surface has an enlarged area configured to contact and support an object 900.

The body 101 includes a cavity 104 within the interior space 107 configured to hold water. The cavity 104 is isolated from other sections of the interior space 107 to prevent cargo and other items stored in the interior space 107 from becoming wet. In one example, the cavity 104 is formed by a separate member 172 that is positioned in the interior space 107. The separate member 172 is constructed from a flexible material that has a reduced sized when not holding water. The flexible material expands when water is moved into the cavity 104.

The one or more ports 105 extend through the body 101 and are in communication with the cavity 104. The ports 105 provide for ingress and egress of the water into and out of the cavity 104. An exhaust port 173 is in communication with an upper section of the cavity 104 to vent the air that is being displaced as the water enters into the cavity 104. The exhaust port 173 can be positioned at a vertically elevated position in the cavity 104 away from the port 105 to exhaust air from the upper reaches of the cavity 104.

One or more pumps 162 provide for moving water into and out of the cavity 104. Associated with the pumps 162, the control circuit 151 can further be configured to control the port 105 (e.g., open or close) depending upon the activation of the one or more pumps 162. At the time the one or more pumps 162 are activated, the port 105 is opened. When the pumps 162 are deactivated, the port 105 is closed to either hold the water that has been pumped into the cavity 104, or to keep the water out after it has been pump out of the cavity 104.

One or more connectors 110 extend outward from or are otherwise configured to connect to adjacent vehicles 100. The connectors 110 can be positioned at various locations on the vehicle 100, including but not limited to the body 101, platform 103, and arms 106. The connectors 110 can provide for attachment in various mechanical manners. FIG. 16A illustrates a first connector 110a having a receptacle sized to receive a head of a second connector 110b. FIG. 16B includes the first and second connectors 110a, 110b with magnets that provide a magnetic force to connect the vehicles 100. The connectors 110 are configured to be autonomously attached together without human intervention. This provides for vehicles 100a, 100b that are remotely located to be connected together. The connectors 110 are also configured for the connectors 110 to detach from one another to provide for the vehicles 100 to separate.

Figure 4:
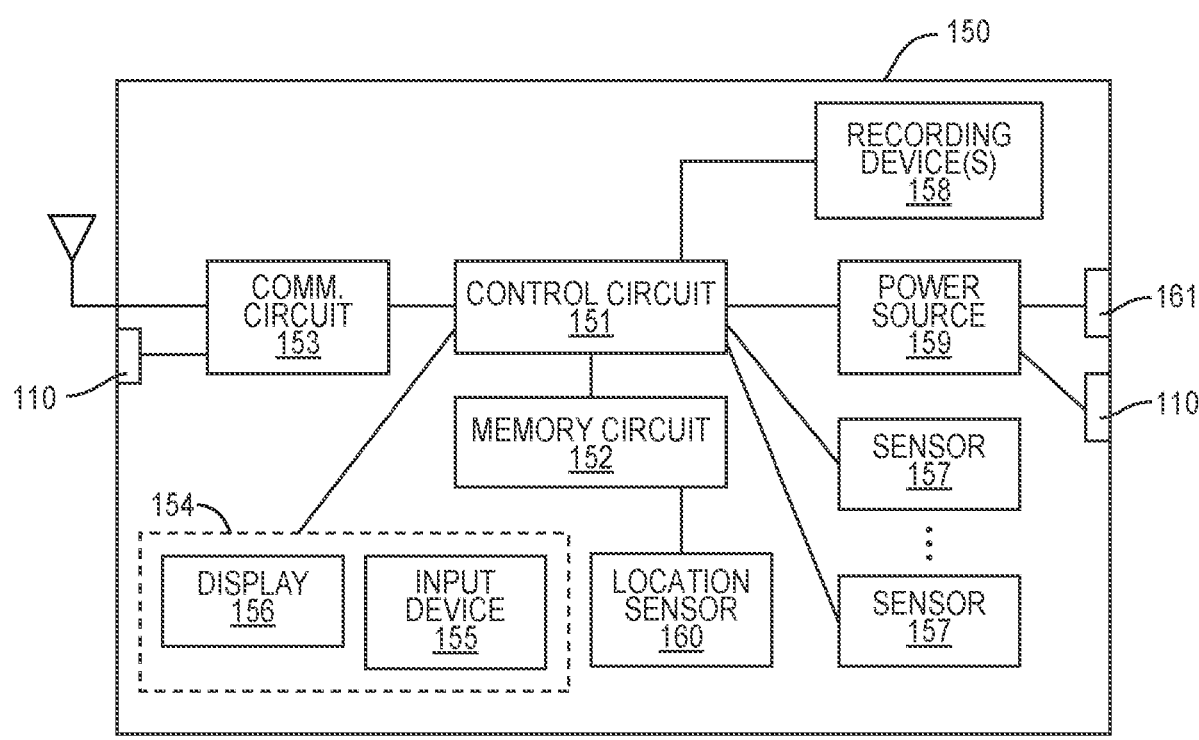
FIG. 4 is a schematic diagram of a control unit.

The vehicle 100 includes a control unit 150 that controls the operation of the vehicle 100 or multiple vehicles 100a, 100b. The control unit 150 controls the operational components of the vehicle 100, including the rotors 102, pump 162, and control members 163. As illustrated in FIG. 4, the control unit 150 includes a control circuit 151 and a memory circuit 152. The control circuit 151 controls the overall operation of the vehicle 100 according to instructions stored in the memory circuit 152. The control circuit 151 can include one or more circuits, microcontrollers, microprocessors, hardware, or a combination thereof. Memory circuit 152 includes a non-transitory computer readable storage medium storing instructions, such as a computer program product, that configures the control circuit 151 to implement one or more of the operations discussed herein. Memory circuit 152 can include various memory devices such as, for example, read-only memory, and flash memory. Memory circuit 152 can be a separate component as illustrated in FIG. 4, or can be incorporated with the control circuit 151. Alternatively, the control circuit 151 can omit the memory circuit 152, e.g., according to at least some embodiments in which the control circuit 151 is dedicated and non-programmable.

The control unit 150 is configured to provide for communication functionality with one or more remote sources and/or between one or more vehicles 100. Communications can include both incoming and outgoing communications over a communications network. A communications circuit 153 can include one or more interfaces that provide for different methods of communication. The communications circuit 153 can include a wireless interface that enables wireless communication via a communication network (e.g., a WCDMA, LTE, or WiMAX radio network). The communication circuit 153 can further include a personal area network interface, such as a Bluetooth interface. The communication circuit 153 can also include a Near Field Communication interface that provides for short-range wireless connectivity technology that uses magnetic field induction to permit devices to share information with each other over short distances. In one example as illustrated in FIG. 4, the communications circuit 153 is incorporated into the control unit 150. In another example, the communications circuit 153 is a stand alone system that is operatively connected to and controlled by the control unit 150.

In one example, the vehicle 100 is configured to autonomously operate. The control unit 150 controls the operation based on a predetermined algorithm stored in the memory circuit 152 and through readings from one or more of the sensors 157.

In one example, the vehicle 100 is configured to be operated remotely based on control signals received through the communication circuit 153. The control circuit 151 receives the signals and operates the vehicle according to the stored instructions. In another example, the vehicle 100 is configured to be operated by an onboard user. A user interface 154 provides for the user to control one or more aspects of the vehicle 100. The user interface 154 can include one or more input devices 155 such as but not limited to a keypad, touchpad, roller ball, and joystick. The one or more input devices 155 provide for the user to enter commands to the control circuit 151. The user interface 154 can also include one or more displays 156 for displaying information to the user. The user interface 154 can also include a communication device that provides for communicating with the remote entities.

One or more sensors 157 detect different aspects of the vehicle 100. The data from the one or more sensors 157 can be stored in the memory circuit 152. One or more sensors 157 detect the physical condition of the vehicle 100, such as but not limited to altitude, depth, speed, orientation in the air (e.g., altitude, pitch, roll, yawl), and orientation in the water (e.g., platform 103 is flat or angled). One or more of the sensors 157 detect operational states of the vehicle 100, such as but not limited to connection with other vehicles 100, amount/level or water within the cavity 104, position of the port 105 (i.e., open or closed), and the amount of energy remaining in a power source 159. One or more sensors 157 can detect situational conditions of the environment surrounding the vehicle 100. Sensed conditions include but are not limited to general weather conditions, air pressure, temperatures, wind speed, and other objects within a range of the vehicle 100.

One or more recording devices 158 can capture images while the vehicle 100 is airborne and/or while the vehicle 100 is underwater. The one or more recording devices 158 can also record video of the vehicle 100, such as the top of the platform 103 to check objects that are being supported above the water, monitor the connection with an adjacent vehicle 100, and monitor the interior space 107 to check the condition of cargo and/or persons. One or more of the recording devices 158 can also record audio of persons on the vehicle 100.

A location sensor 160 detects the geographic location of the vehicle 100. Location sensor 160 can include a global positioning system (GPS) component that receives coordinate information from various sources (e.g., satellites, base stations) to determine a geographic position of the vehicle 100.

Figure 3B:
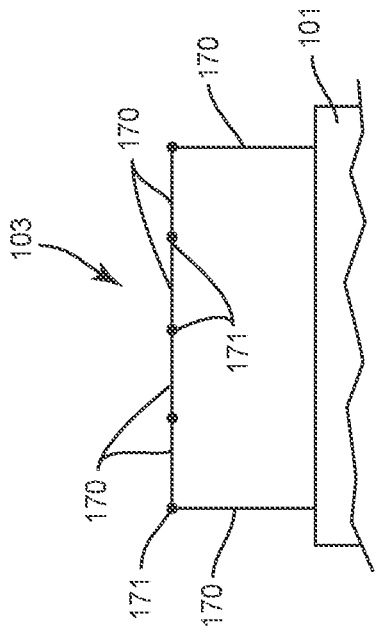
FIG. 3B is a schematic diagram of the platform of FIG. 3A in a deployed orientation.
Figure 3A:
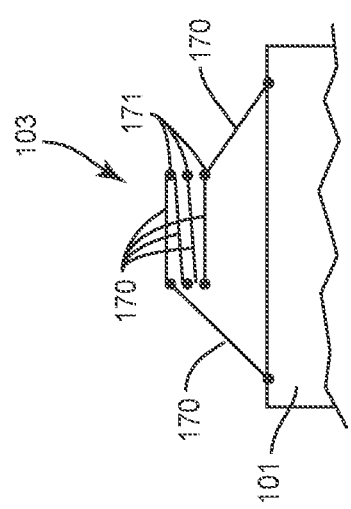
FIG. 3A is a schematic diagram of a platform in a stowed orientation.

A power source 159 provides power to the vehicle 100. The power source 159 can include various configurations, including but not limited to batteries. One or more solar panels 161 can be mounted on the exterior vehicle 100, such as on the platform 103 to recharge the power source 159. FIG. 3 includes the power source 159 incorporated with the control unit 150. In another example, the power source 159 can be separate from the control unit 150. In one example, the power source 159 includes power sharing circuitry to enable power to be shared between different vehicles 100 that are connected together. The power sharing circuitry can provide for both receiving power from one or more other vehicles 100, as well as receiving power from one or more other vehicles 100. The power sharing circuitry can include one or both of inductive power circuitry and wired power circuitry.

Figure 5:
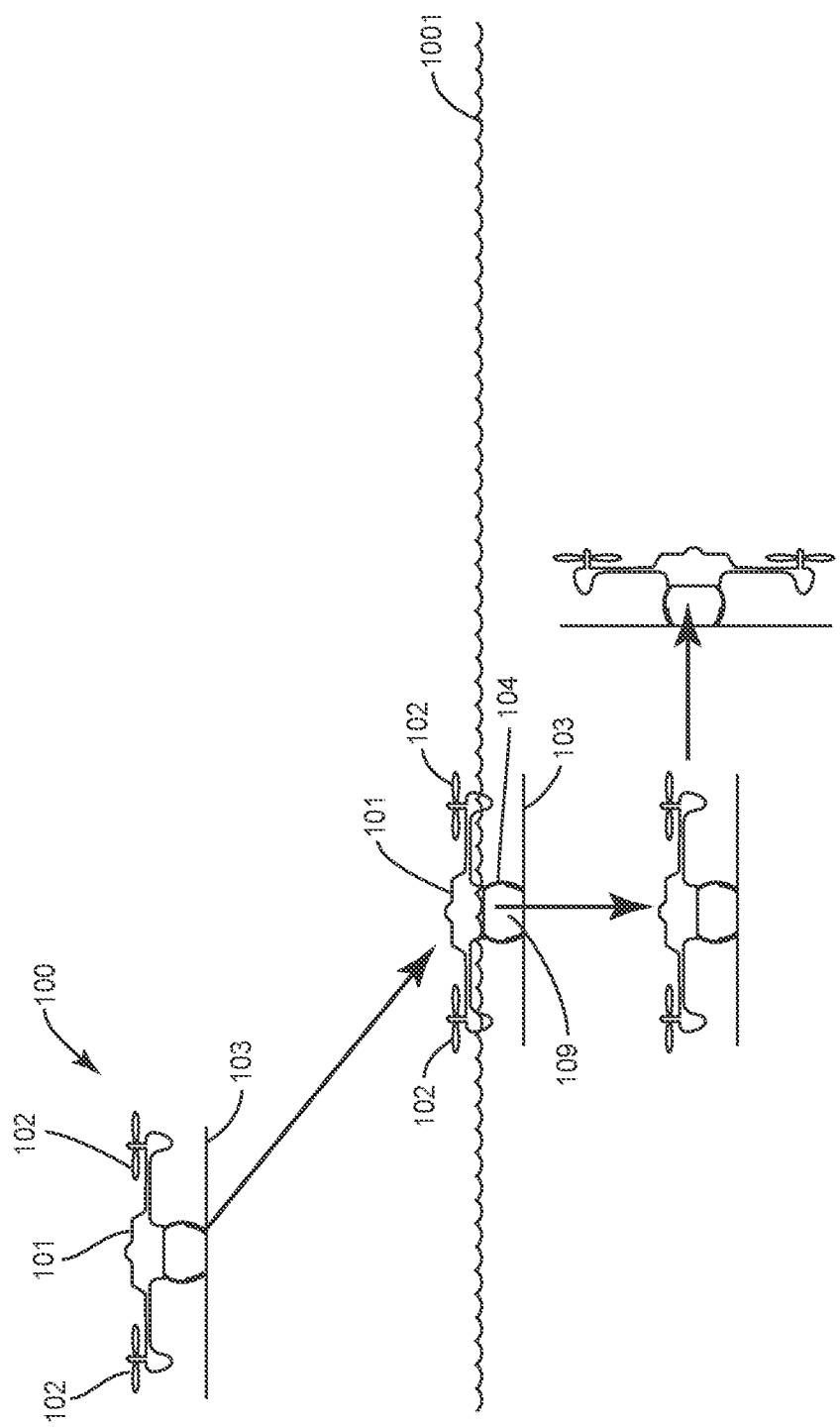
FIG. 5 is a schematic diagram of a vehicle during movement in the air and in the water.

The vehicle 100 is configured to fly in the air and also move underwater. FIG. 5 illustrates an example of the vehicle 100 in both air and water. During flight, the rotors 102 maintain the vehicle 100 at various elevations. In one example as illustrated in FIG. 5, the orientation of the vehicle 100 in the air includes the rotors 102 positioned upward relative to the body 101 and platform 103. The vehicle 100 can also operate and fly in the inverted orientation with the platform 103 positioned above the body 101 and the rotors 102 below.

Figure 6:
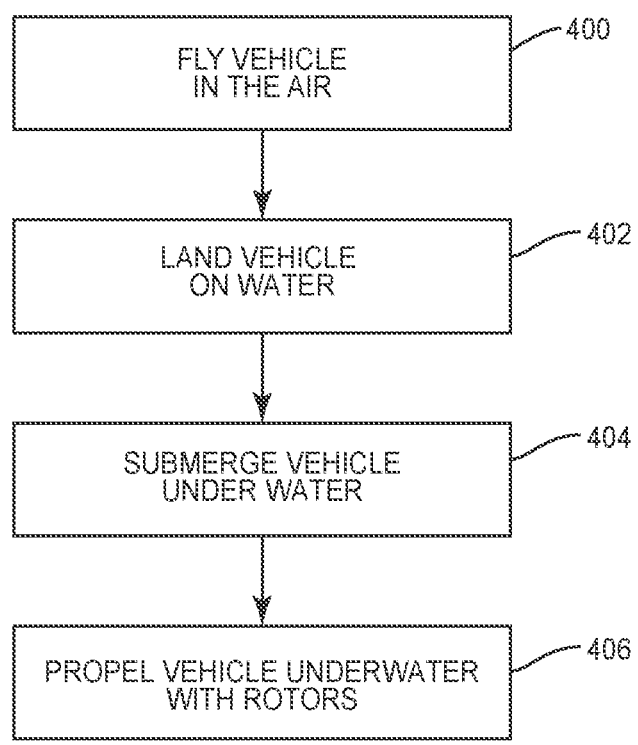
FIG. 6 is a flowchart diagram of a method of operating a vehicle.

FIG. 6 illustrates a method of operating the vehicle 100 in the air and in the water 1001. The vehicle 100 flies through the air and over the water 1001 to the desired location (block 400). The vehicle is flown down and lands on the water 1001 (block 402). In one example, the vehicle 100 lands in the water 1001 with the platform 103 and cavity 104 positioned in the water 1001 and the rotors 102 positioned above the water 1001. In one example, a sensor 157 on the vehicle 100 detects when the vehicle 100 is in or on the water. The sensor 157 can be configured or positioned to determine the extent to which the vehicle 100 is submerged. For example, the sensor 157 can be positioned at the middle of the body 101 to indicate when the vehicle 100 is submerged to this level. One or more sensors 157 can be positioned at various locations to detect the positioning of the vehicle 100 in the water 1001.

After the vehicle 100 is on the surface of the water 1001, the vehicle 100 is then able to submerge into the water (block 404). In one example, the rotors 102 remain active and propel the vehicle 100 to submerge into the water 1001. In another example, the port 105 on the cavity 104 is opened providing for water to enter into the cavity 104. The water can enter into the port 105 as a result of the vehicle 100 being positioned in the water. Additionally or alternatively, the pump 162 is activated to move water into the cavity 104.

In one example, the vehicle 100 is constructed from materials and is buoyant in the water 1001. Thus, the vehicle 100 floats in the water 1001 even when not being propelled by the rotors 102. In one example, water is input into the cavity 104 to adjust the buoyancy to provide for the vehicle 100 to descend into the water 1001. The amount of water input into the cavity 104 can vary depending upon the desired buoyancy. In another example, the buoyancy is overcome by the rotors 102 applying a force that drives the vehicle 100 into the water 1001. In another example, the vehicle 100 sinks in the water 1001. This can be the result of one or more of the materials from which the vehicle 100 is constructed and the ballast 109 in the vehicle 100.

Once underwater, the vehicle 100 is propelled by the rotors 102 (block 406). As illustrated in FIG. 5, the vehicle 100 can operate at various orientations to move underwater. Further, the vehicle 100 includes a ballast 109 to provide stability when moving through the water. In one example, the water in the cavity 104 acts as a ballast 109. The amount of water in the cavity 104 can vary depending upon the necessary weight. The ballast 109 can also include one or more other components. In one example, the ballast 109 is formed by weight of the body 101 and/or platform 103. In another example, cargo within the interior space 107 of the body 101 forms the ballast 109. The ballast 109 can also be formed by combinations of two or more of these components.

The control circuit 151 adjusts the amount of water in the cavity 104 to control the buoyancy and facilitate movement in the water. For example, the cavity 104 can be filled with water when the vehicle 100 is descending in the water 1001. To move under the water, the control circuit 151 can adjust the amount of water in the cavity 104 as needed to control the movement of the vehicle 100. To ascend, water is pumped out of the cavity 104. Also, the rotors 102 create thrust to lift the vehicle 100 out of the water.

The vehicle 100 operates in the air and underwater in similar manners. Direction of the vehicle 100 can be controlled by operating the different rotors 102 at different rotational speeds. Additionally or alternatively, the one or more control members 163 are adjusted to control the direction of movement of the vehicle 100.

Figure 7:
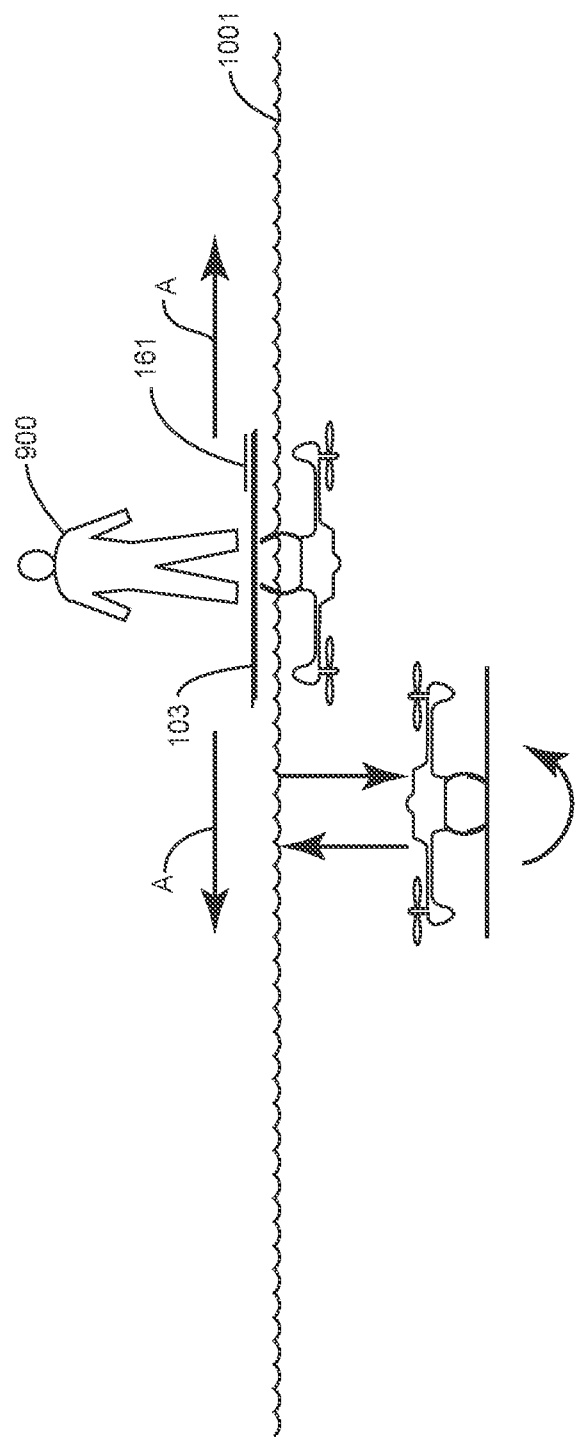
FIG. 7 is a schematic diagram of movement of a vehicle in water to support an object.

In the water, the vehicle 100 is configured to position and support the platform 103 above the water 1001 as illustrated in FIG. 7. The vehicle 100 can support one or more objects 900 on the platform 103 and keep the object 900 above the water, such as a person in a rescue operation or supplies. Additionally or alternatively, the rotors 102 can create thrust/lift to maintain the platform 103 above the water.

Figure 8:
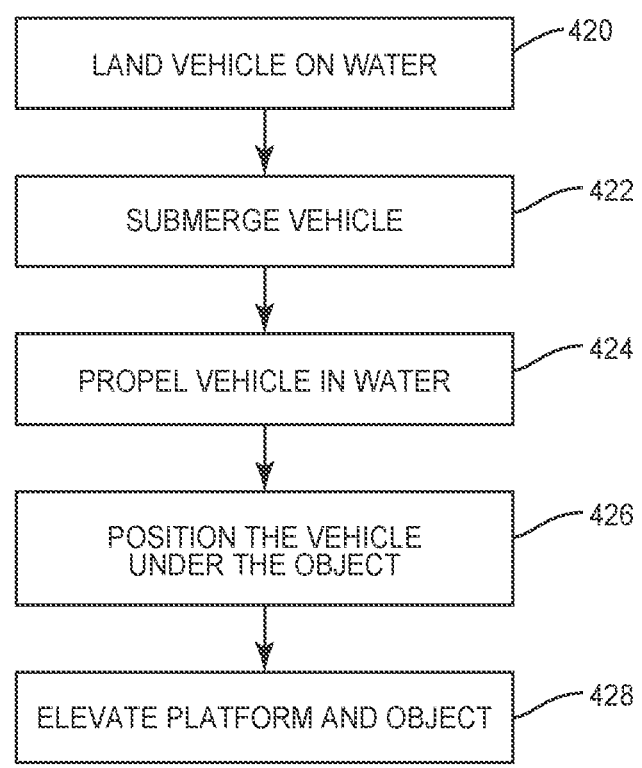
FIG. 8 is a flowchart diagram of a method of operating a vehicle.

FIG. 8 illustrates a method of using the vehicle 100 to support an object in or floating on the water. The vehicle 100 initially lands on the water 1001 (block 420) and submerges (block 422). During submerging, the one or more rotors 102 are positioned vertically above the platform 103 and propel the vehicle 100 into the water 1001. The vehicle 100 is propelled in the water by the rotors 102 (block 424). The vehicle 100 can move underwater while in various orientations, including with the rotors 102 operating in a first direction to push the vehicle 100 and operating in a second direction to pull the vehicle 100 through the water 1001.

The vehicle 100 is steered with the platform 103 positioned underneath the object 900 (block 426). The one or more rotors 102 are than operated to elevate the vehicle 100 with the platform 103 contacting against and supporting the object 900 above the water 1001 (block 428). In this position, the rotors 102 remain in the water 1001 to provide the necessary propulsion force to maintain the position of the platform 103 above the water 1001.

In another example, the vehicle 100 is moved underwater and into proximity of the object 900. The vehicle 100 is operated with the platform 103 above the water and the object 900 (such as a person) can swim over to and get onto the platform 103.

The solar panels 161 can be positioned on the platform 103 to be exposed when the platform 103 is positioned above the water 1001. Additionally or alternatively, one or more solar panels 161 are controllably positioned on a bottom side of the platform 103 or body 101 and exposed to the sun when the vehicle 100 is moving underwater and when flying.

In one example, water in the cavity 104 is expelled through the port 105 to facilitate positioning the platform 103 above the water 1001. The water can be expelled from the cavity 104 to assist elevating the platform 103 above the water 1001. Some of the water can remain in the cavity 104 to provide the needed weight of the ballast 109 to maintain the orientation of the vehicle 100 and to stabilize the vehicle 100.

In addition to elevating the platform 103 above the water 1001 to support an object 900, the vehicle 100 can also move laterally along the water as illustrated by arrows A in FIG. 7. This propulsion is provided through the one or more rotors 102 that can operate at various speeds to provide the lateral propulsion to navigate the vehicle 100 floating in the water 1001. As illustrated by the arrow in FIG. 7, the vehicle 100 is also able to change the orientation underwater to position the platform 103 as needed.

The vehicle 100 is able to return airborne after entering the water 1001. After traveling in the water, the vehicle 100 moves to the surface of the water 1001. The vehicle 100 is positioned in an orientation such that the rotors 102 are located above the water 1001. The rotors 102 and are activated to provide an upward force to pull the vehicle 100 out of the water 1001 and into the air. Once airborne, the vehicle 100 is operated as previously described. Prior to exiting the water 1001, the water is expelled from the cavity 104. This water can be removed by either activating the pump 162 or otherwise allowing the water to drain through the port 105. Once the water is removed, the rotors 102 can be activated to fly the vehicle 100 out of the water 1001.

Figure 9:
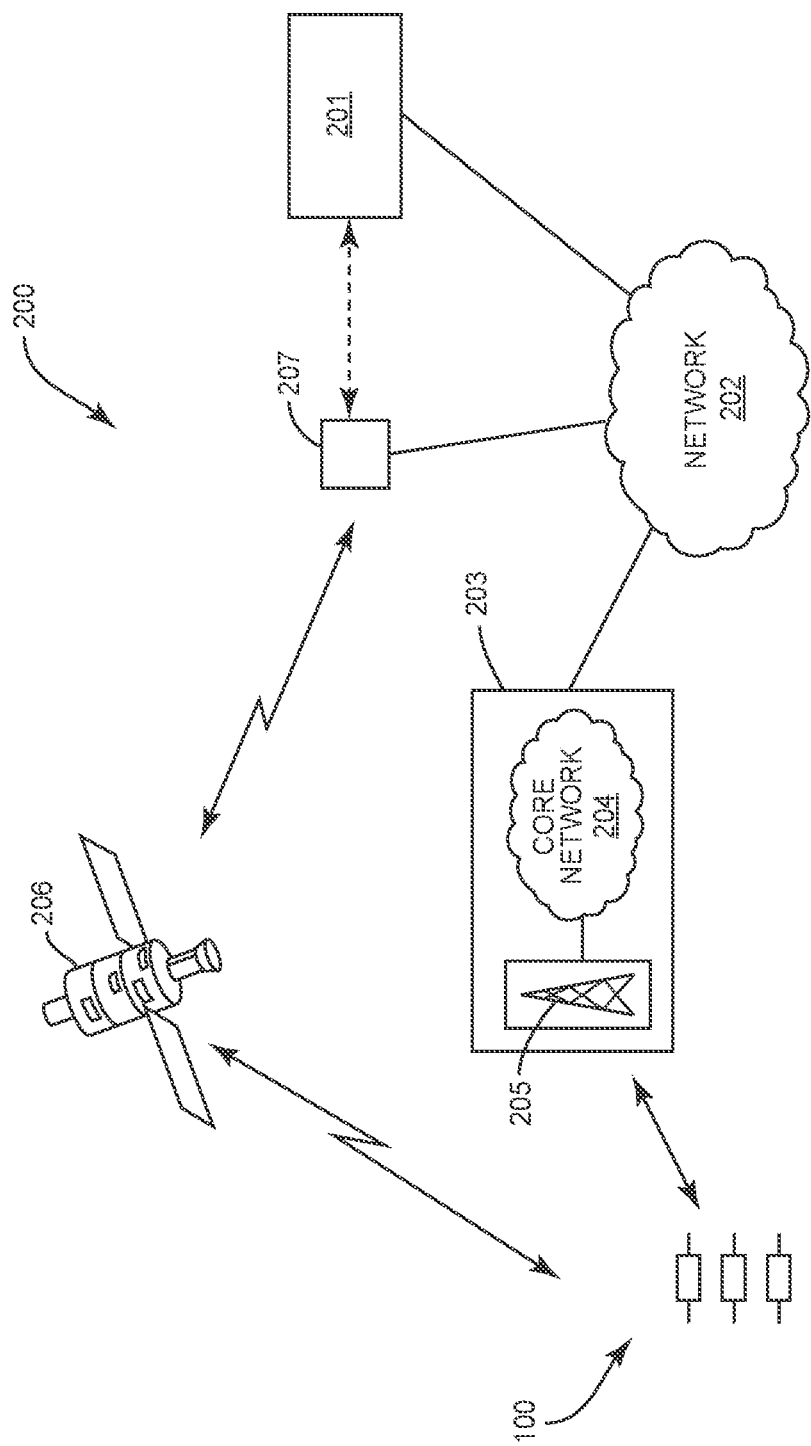
FIG. 9 is a schematic diagram of a wireless communication network.

In one example, one or more of the vehicles 100 are unmanned and controlled by a remote computing device 201. Commands for controlling the movement of the vehicles 100 are communicated from the remote computing device 201 through a wireless communication network 200 as illustrated in FIG. 9. The wireless communication network 200 includes a packet data network (PDN) 202 that can include a public network such as the Internet, or a private network. The wireless communications network 200 can include a mobile communication network 203 (e.g., a WCDMA, LTE, or WiMAX network). The mobile communication network (MCN) 203 includes a core network 204 and a radio access network (RAN) 205 including one or more base stations. The MCN 203 can be a conventional cellular network operating according to any communication standards now known or later developed. For example, the MCN 203 can comprise a Wideband Code Division Multiple Access (WCDMA) network, a Long Term Evolution (LTE) network, or WiMAX network. The MCN 203 is further configured to access the packet data network (PDN) 202.

The wireless communication network 200 also provides for communication through one or more satellites 206. In one example, satellite communication is a mode of communication. The computing device 201 and ground stations 207 can communicate through the satellites 206. The ground stations 207 can communicate to the computing device 201 through the PDN 202, or without use of the PDN 202.

In another example, one or more of the vehicles 100 are piloted by one or more persons. The persons can control the operation of the vehicles 100. In one example, the remote computing device 201 monitors the movement and operation of the vehicles 100.

Figure 10:
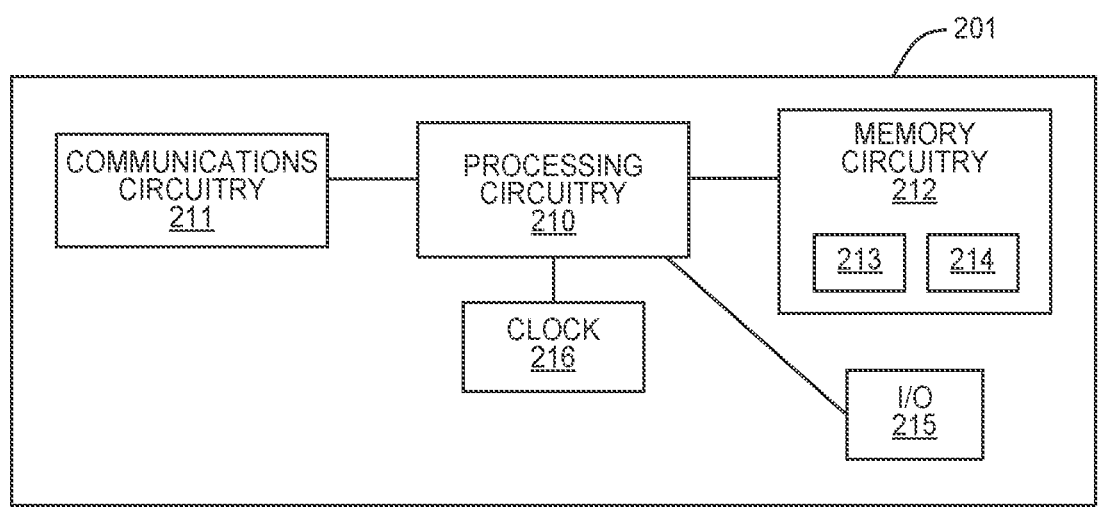
FIG. 10 is a schematic diagram of a computing device.

FIG. 10 is a functional block diagram of a computing device 201. The computing device 201 comprises processing circuitry 210, memory circuitry 212, a user input/output (I/O) interface 215, and communications circuitry 211.

The processing circuitry 210 is communicatively coupled via one or more buses to the memory circuitry 212, I/O 215, and communications circuitry 211. The processing circuitry 210 can include one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one example, the processing circuitry 210 includes programmable hardware capable of executing software instructions stored, e.g., as a machine-readable computer control program 214 in memory circuitry 212. More particularly, the processing circuitry 210 is configured to execute the control program 214 to determine the movement and positioning of the vehicles 100. The processing circuitry 210 is configured to implement this functionality in accordance with the data and information stored in a database 213. The database 213 is stored in a non-transitory computer readable storage medium (e.g., an electronic, magnetic, optical, electromagnetic, or semiconductor system-based storage device). The database 213 can be local or remote relative to the computing device 201. In one example, the database 213 is incorporated in the memory circuitry 212.

A clock 216 measures various timing requirements regarding the travel of the vehicle 100. The clock 216 can be incorporated with the processing circuitry 210, or can be a separate component independent from the processing circuitry 210 as illustrated in FIG. 10.

The I/O 215 comprises circuitry configured to allow a person at the remote location enter commands to communicate with and/or operate the vehicles 100. The user I/O 215 can comprise a variety of different devices and/or circuitry. However, in one aspect, I/O 215 includes, but is not limited to, display devices such as a Liquid Crystal Display (LCD) and/or a Light Emitting Diode (LED) display for presenting visual information to a person located at the computing device 201 such as a worker at the remote location who is operating the vehicles 100. The I/O 215 can also include one or more graphics adapters, display ports, video buses, a touchscreen, a graphical processing unit (GPU), and audio output devices such as speakers, as well as circuitry and devices for accepting input from the user. Such input circuitry and devices include a pointing device (e.g., a mouse, stylus, touchpad, trackball, pointing stick, joystick), a microphone (e.g., for speech input), an optical sensor (e.g., for optical recognition of gestures), and/or a keyboard (e.g., for text entry). The user I/O 215 can be implemented as a unitary physical component, or as a plurality of physical components that are contiguously or separately arranged, any of which may be communicatively coupled to any other, or communicate with any other component via processing circuitry 210.

The communications circuitry 211 is configured to facilitate the communication with remote entities. In one example, the communications circuitry 211 includes a transceiver configured to send and receive communication signals through the wireless communication network 200.

Figure 11:
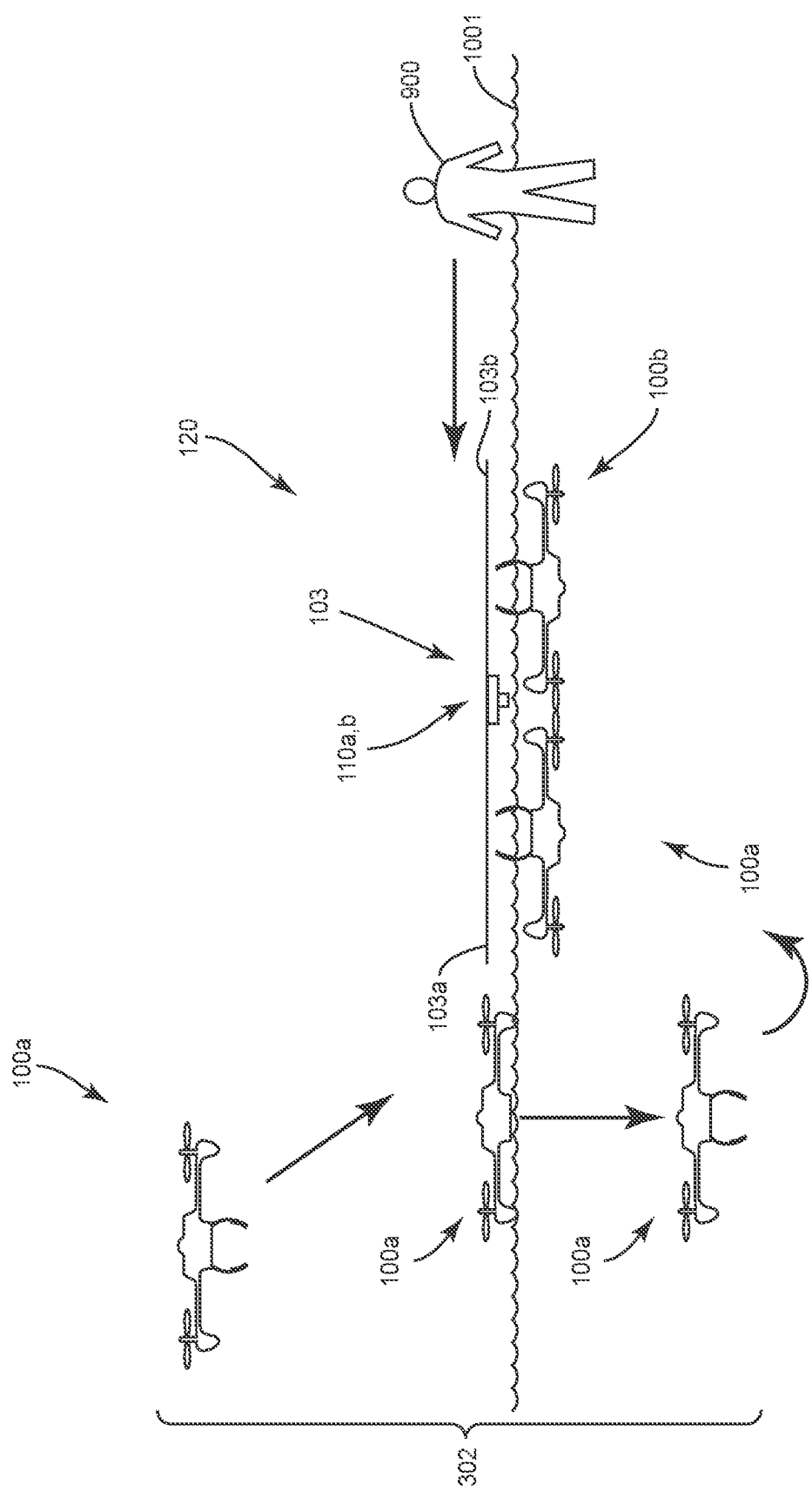
FIG. 11 is a schematic diagram of movement of a vehicle into the water and connecting with another vehicle.
Figure 12:
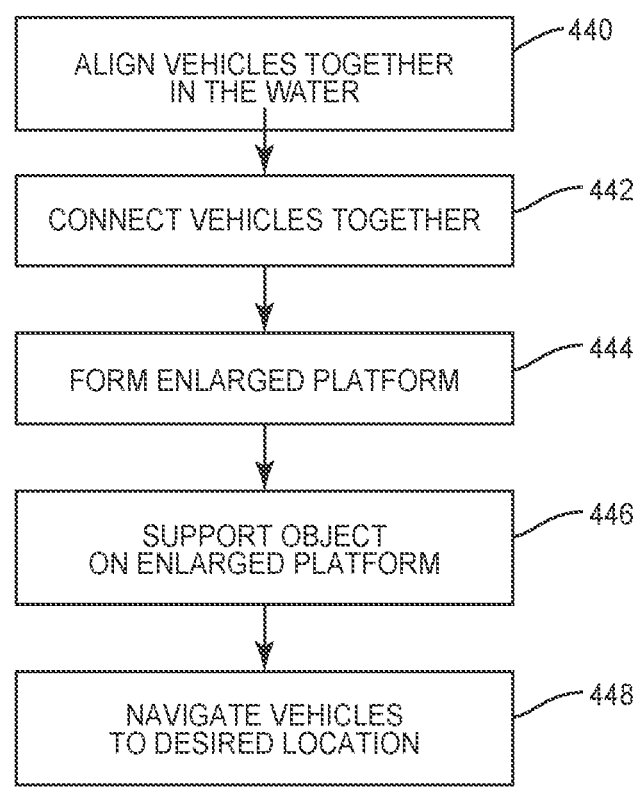
FIG. 12 is a flowchart diagram of a method of connecting vehicles together and supporting an object.

In addition to operating individually to perform various flight and water operations, the vehicles 100 are further configured to connect together and operate as a collective unit 120. This can include connecting multiple vehicles 100 together to form an enlarged platform 103, by connecting the individual platforms 103a, 103b, for supporting the object 900. FIG. 11 illustrates this concept with two vehicles 100a, 100b connecting together and FIG. 12 includes the steps of a method of connecting vehicles 100 together. As illustrated, both vehicles 100a, 100b are positioned in the water 1001. The vehicles 100a, 100b can arrive at the same or different times. In the example of FIG. 11, vehicle 100b is in the water 1001 prior to the arrival of vehicle 100a. This vehicle 100b is positioned with the platform 103 above the water 1003 and supported by one or more of the rotors 102 and/or the buoyancy of the vehicle 100b.

The second vehicle 100a flies to the proximity of the vehicle 100b and lands on the water 1001. In this example, the platform 103 is in the stowed orientation while the vehicle 100a is flying through the air. Upon landing on the water 1001, the vehicle 100a submerges and inverts. At some point after landing in the water 1001, the platform 103 is deployed. The vehicles 100a, 100b align together (block 440) and the connectors 110a, 110b attach together to connect the vehicles 100a, 100b (block 442). The individual platforms 103a, 103b are aligned and form segments of an enlarged platform 103 that can support the object 900 (block 442). The vehicles 100a, 100b are coordinated to move the enlarged platform 103 out of the water and support the object 900 (block 446). The vehicles 100a, 100b can be propelled laterally along the surface of the water to the object 900 to support and carry the object as necessary (block 448). After supporting the object 900, the vehicles 100a, 100b can move towards land or other location to provide for rescue. In another example, the vehicles 100a, 100b can remain at the same general location and maintain the object 900 above the surface of the water 1001.

In the example described above, the vehicles 100a, 100b are in the water at the time of connection. In another example, the vehicles 100a, 100b connect in the air. After connection, the vehicles 100a, 100b move as a unit into the water 1001 and under the object to provide support.

The connectors 110 can autonomously engage with one another. In one example, one or more sensors 157 on one or more of the vehicles 100 sense the location of the vehicle 100 relative to another vehicle 100. Signals from the one or more sensors 157 are sent to the control circuit 151 which is programmed to position the vehicles 100 to provide for the connectors 110 to autonomously connect together. The connectors 110 are positioned to engage together without the rotors 102 or other structures on the vehicles 100 from interfering with the other vehicle 100 or the connection. In one example, one or more of the vehicles 100 includes a recording device 158 that captures images of the connectors 110. The control circuit 151 includes shape recognition software analyzes the images to control the positioning of the vehicles 100 and provide for the connectors 110 to connect together. The various connection processes are effective for both water and air connections.

Figure 13:
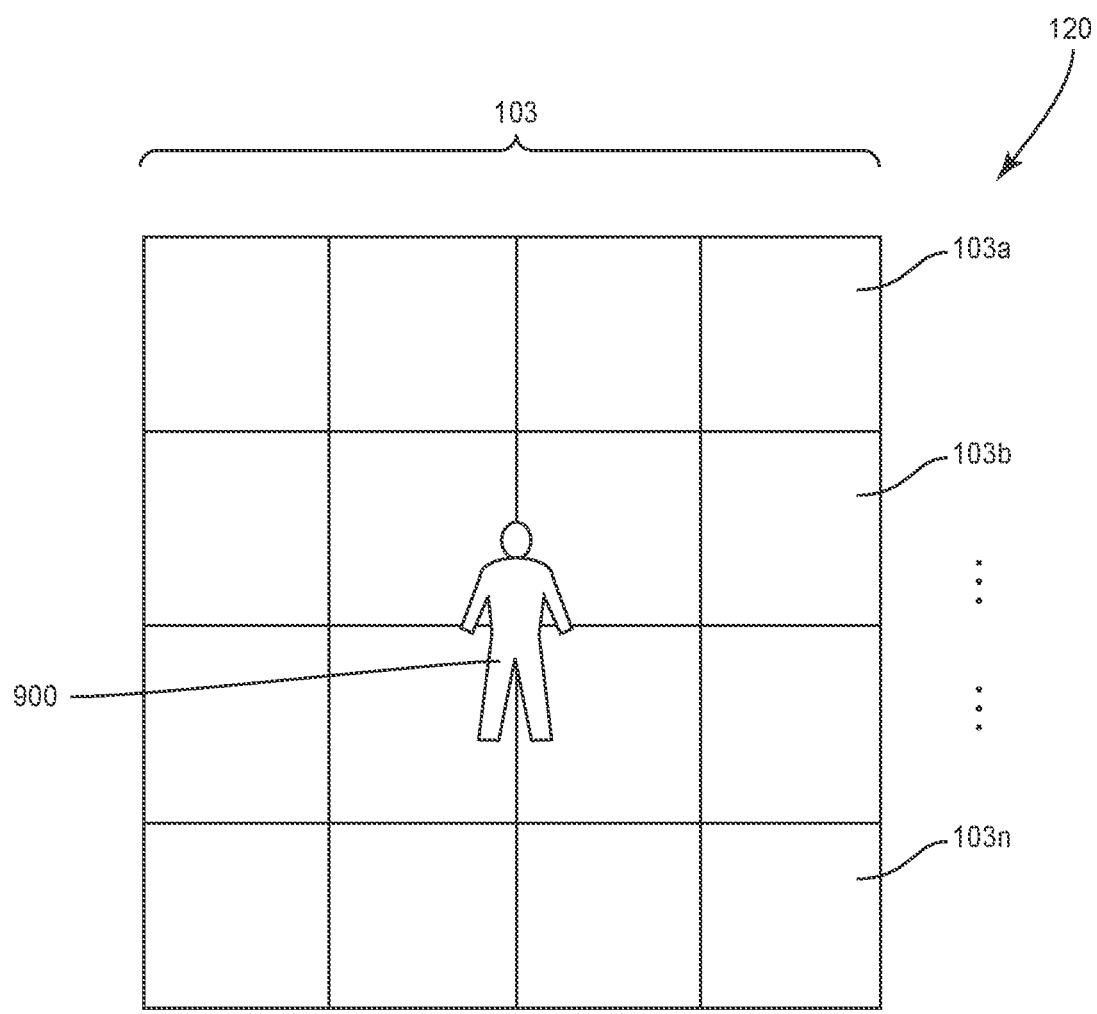
FIG. 13 is a schematic diagram of an object positioned on an enlarged platform constructed from a plurality of segments.

Multiple interconnected vehicles 100 form a collective unit 120. The number of vehicles 100 in a collective unit 120 can range from a pair of vehicles 100 (FIG. 11) to numerous vehicles 100 (FIG. 13). FIG. 13 specifically includes a collective unit 120 with sixteen vehicles 100 connected together in a 4×4 grid. The vehicles 100 can be connected together in various manners for the collective units 120 that have a variety of shapes and sizes. Each of the individual platforms 103 forms a segment of the overall enlarged platform 103. In one example as illustrated in FIG. 13, the individual platforms 103 are sized to abut together such that the enlarged platform 103 is continuous without openings between the adjacent platforms 103. In other examples, the platforms 103 are relatively small such that one or more openings are formed between adjacent platforms 103. The different platforms 103 of the different vehicles 100 can be the same or different shapes and/or sizes. In one example as illustrated in FIG. 13, each platform includes the same polygonal shape and size which facilitates connected the vehicles 100 together.

The connectors 110 provide for the vehicles 100 to communicate with each other after connection. Information can be shared between the vehicles 100, including but not limited to the amount of remaining energy in the power source 159 and one or more readings from the sensors 157. As illustrated in FIGS. 16A and 16B, the connectors 110 include one or more leads 111, 112 that engage together when the vehicles 100 are connected. The leads 111, 112 provide for data and electrical power to be shared between the connected vehicles 100. In one example, a first lead 111 provides for communication of data and second lead 112 provides for sharing power.

Figure 14:
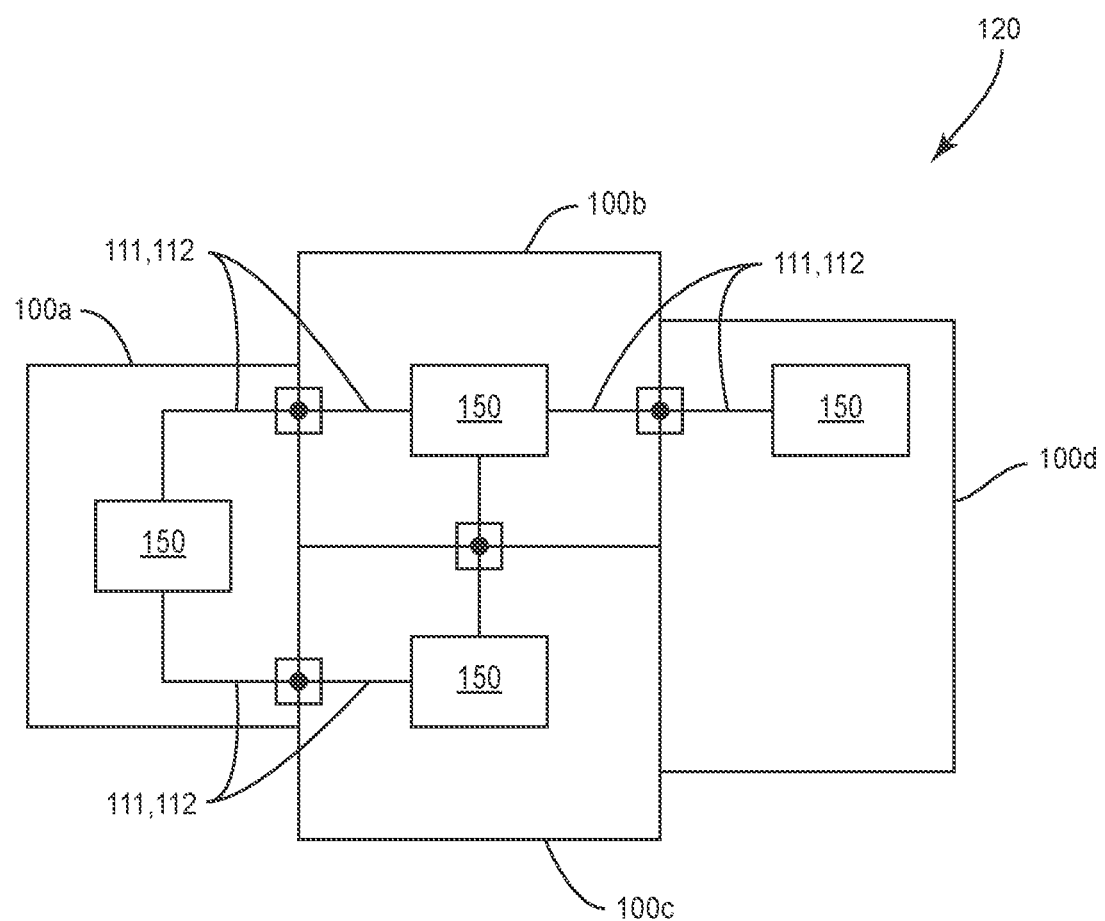
FIG. 14 is a schematic diagram of a plurality of vehicles connected together.

After the collective unit 120 is formed, the different vehicles 100 act as a single unit that is controlled by the control unit 150 of one of the vehicles 100. FIG. 14 illustrates a collective unit 120 formed by four vehicles 100a, 100b, 100c, 100d. Each of the vehicles 100 is directly connected to one or more other vehicles 100 in the collective unit 120, and indirectly through the remaining vehicles 100. The control unit 150 of each of the vehicles 100 are interconnected through the one or more leads 111, 112. This configuration provides for data and resources to be shared among each of the vehicles 100 in the collective unit 120. Additionally or alternatively, the vehicles 100 communicate wirelessly and the physical connections provide for power distribution.

Figure 15:
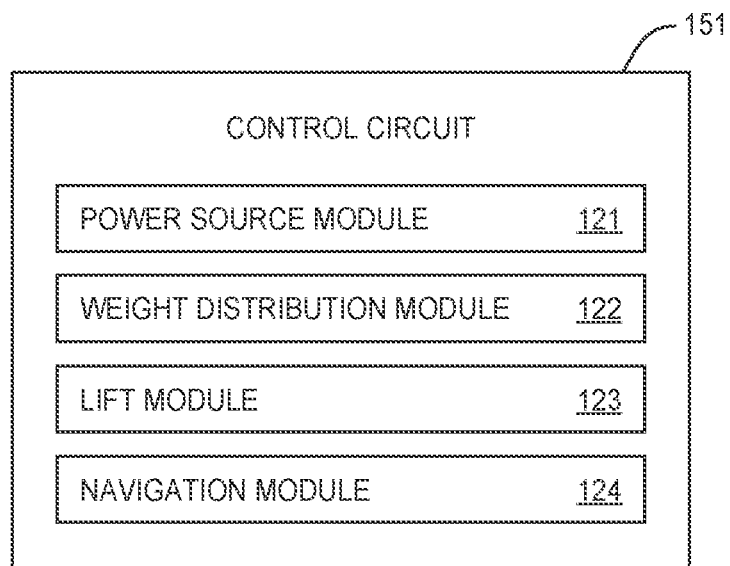
FIG. 15 is a schematic diagram of a control circuit and its functional modules.

In the example of FIG. 14, vehicle 100a is the control vehicle and controls the overall operation of the collective unit 120. The control unit 150 of the vehicle 100a is configured to oversee the operation of the collective unit 120. FIG. 15 is a functional block diagram illustrating the control circuit 151 of the control unit 150 implemented according to different hardware units and software modules (e.g., as one or more control programs stored on the memory circuit 152).

A power source module 121 functions to determine the amount of power remaining in the power source 159 of each vehicle 100. In one example with the power sources 159 comprising one or more batteries, the power source module 121 determines a remaining charge. The power source module 121 further functions to transfer power from one vehicle 100 to another. Using the example of FIG. 14, the power source module 121 can transfer a charge along one or more leads 111, 112 from vehicle 100d to vehicle 100c. In making the transfer, the charge moves through the one or more leads 111, 112 of the intermediate vehicle 100b. The power source module 121 can also determine the capacity of the one or more solar panels 161 to recharge the one or more power sources 159.

A weight distribution module 122 functions to determine an amount of weight that is being supported by the collective unit 120. This can include determining the amount of weight of the one or more objects 900 supported on the enlarged platform 103. The determination can be performed by one or more weight sensors 157 in the vehicles 100. Weight distribution module 122 can also determine the buoyancy of the collective unit 120 in the water based on signals from one or more sensors 157. This can also include the orientation of the enlarged platform 103. In one example, the weight distribution module 122 aims for the enlarged platform 103 to be substantially parallel to the surface of the water 1001. In another example, the weight distribution module 122 aims for the enlarged platform 103 to remain within an angular range to the surface of the water 1001 (e.g., +/−10°).

The weight distribution module 122 also functions to control the amount of water held in the cavity 104 of each of the vehicles 100. The weight distribution module 122 can signal one or more of the vehicles to expel water to level the platform 103 and/or alter the orientation of the platform 103 and/or increase the buoyancy of the collective unit 120. The weight distribution module 122 can signal one or more of the vehicles 100 to take in water to level the platform 103 and/or to alter the buoyancy.

A lift module 123 functions to operate the one or more rotors 102 of the vehicles 100 to maintain the desired orientation of the enlarged platform 103. The lift module 123 signals the various rotors 102 to operate at speeds to maintain the orientation. For example, the rotors 102 of vehicles 100b and 100d may operate at a first speed and rotors 102 of vehicle 100c can operate at a different second speed due to the uneven weight distribution of the objects 900 detected by the weight distribution module 122. One or more rotors 102 can be deactivated if their propulsion is not needed to maintain the position. In another example, the activation and deactivation of the rotors 102 is cycled such that each rotor 102 operates for a limited time period and is then deactivated. This cycling can provide for equally distributing the workloads to prevent one or more of the rotors 102 from being over-used and potentially wearing out or breaking.

The lift module 123 can also determine whether additional lifting capacity is needed to maintain the enlarged platform 103 above the level of the water 1001. The lift module 123 is configured to signal a request for additional vehicles 100 upon determining that the current lifting capacity is not adequate to maintain the lifting platform 103 above the water 1001. In one example, the lift module 123 determines the future capacity of the rotors 102 including the remaining charge from the power sources 159. If the future capacity does not meet the expected demand, the lift module 123 can cause the request to occur. The lift module 123 can also determine that there is excess lifting capacity and signal one or more of the vehicles 100 to detach from the collective unit 120.

A navigation module 124 functions to propel the collective unit 120 and the supported object 900 to a destination. The navigation module 124 causes one or more of the rotors 102 to operate and propel the collective unit 120 in a given direction. The navigation module 124 can include destination coordinates of the location to which the collective unit 120 and object 900 are to be transported. The navigation module 124 can also include the orientation at which the enlarged platform 103 is to be maintained. The navigation module can include an inertial navigational system to provide for navigating during flight and in the water.

In another example, two or more vehicles 100 operate to control the collective unit 120. The various functions are divided by the control vehicles 100 with each of the control vehicles 100 controlling at least one function.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A submergible aerial vehicle, the vehicle comprising:
   one or more rotors;
   a body operatively connected to the one or more rotors;
   a platform operatively connected to the body, wherein:
      the platform is configured to form a segment of a floating platform, and
   a cavity, wherein:
      the cavity is in the body, and
      when at least partially filled with fluid, the cavity causes the submergible aerial vehicle to be at least partially submerged in a body of water;
   wherein the floating platform is formed by platforms of a plurality of submergible aerial vehicles, and the floating platform is configured to support an object.

2. The submergible aerial vehicle of claim 1, wherein the cavity comprises a ballast.

3. The submergible aerial vehicle of claim 2, wherein the ballast comprises supplies.

4. The submergible aerial vehicle of claim 2, wherein the ballast comprises at least a portion of the platform.

5. The submergible aerial vehicle of claim 2, wherein at least a portion of the ballast is collapsible.

6. The submergible aerial vehicle of claim 1, further comprising a pump for pumping the fluid in the cavity, wherein the pump is operatively connected to the cavity.

7. The submergible aerial vehicle of claim 1, further comprising a pump for pumping the fluid out of the cavity, wherein the pump is operatively connected to the cavity.

8. The submergible aerial vehicle of claim 1, wherein the submergible aerial vehicle is operable to expel at least some fluid out of the cavity to maintain a level of buoyancy when weight is added to the platform.

9. The submergible aerial vehicle of claim 1, further comprising a power source operatively connected to the body.

10. The submergible aerial vehicle of claim 9, further comprising a solar panel operatively connected to the platform to recharge the power source.

11. The submergible aerial vehicle of claim 1, wherein the submergible aerial vehicle is connectable to a second submergible aerial vehicle.

12. The submergible aerial vehicle of claim 1, wherein the submergible aerial vehicle is operable to maneuver in the water, at least partially submerged, via controlling the one or more rotors.

13. The submergible aerial vehicle of claim 1, wherein the submergible aerial vehicle is operable to rotate when at least partially submerged, via controlling the one or more rotors.

14. A system of connectable submergible aerial vehicles, the system comprising:
   a plurality of submergible aerial vehicles, each comprising:
      one or more rotors,
      a body operatively connected to the one or more rotors;
      a platform operatively connected to the body, wherein:
         the platform is configured to form a segment of an enlarged platform; and
      a cavity, wherein:
         the cavity is in the body, and
         when at least partially filled with fluid, the cavity causes the submergible aerial vehicle to be at least partially submerged in a body of water;
   wherein the enlarged platform is formed by the platforms of the plurality of submergible aerial vehicles, and the enlarged platform is configured to support an object.

15. The system of claim 14, wherein each of the cavities comprises a ballast.

16. The system of claim 15, wherein each of the ballasts comprises at least a portion of the platform.

17. The system of claim 14, wherein each of the vehicles comprises a pump for pumping the fluid out of the cavity, wherein the pump is operatively connected to the cavity.

18. The system of claim 17, wherein the submergible aerial vehicle is operable to expel at least some fluid in order to fly above the body of water.

19. The system of claim 14, wherein at least one of the submergible aerial vehicles comprises an inertial navigational system.

20. A method of submerging a submergible aerial vehicle, the method comprising:
   operating a submergible aerial vehicle over a body of water;
   maneuvering a cavity of the submergible aerial vehicle to contact the body of water, wherein:
      the cavity is below a surface of a platform of the submergible aerial vehicle, and the platform is configured to form a segment of an enlarged platform, the enlarged platform is formed by platforms of a plurality of submergible aerial vehicles; and
   taking fluid into the cavity, wherein the platform is floating and is configured to support an object.

* * * * *